(12) United States Patent
Nguyen et al.

(10) Patent No.: US 7,500,521 B2
(45) Date of Patent: Mar. 10, 2009

(54) METHODS OF ENHANCING UNIFORM PLACEMENT OF A RESIN IN A SUBTERRANEAN FORMATION

(75) Inventors: Philip D. Nguyen, Duncan, OK (US); Richard D. Rickman, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 298 days.

(21) Appl. No.: 11/482,602

(22) Filed: Jul. 6, 2006

(65) Prior Publication Data

US 2008/0006406 A1  Jan. 10, 2008

(51) Int. Cl.
   *E21B 33/138* (2006.01)
   *E21B 43/12* (2006.01)
(52) U.S. Cl. ..................... 166/295; 166/300
(58) Field of Classification Search ................. 166/263, 166/295, 300, 305.1, 312
   See application file for complete search history.

(56) References Cited

U.S. PATENT DOCUMENTS

| | | | |
|---|---|---|---|
| 2,238,671 A | 4/1941 | Woodhouse ................. 166/21 |
| 2,703,316 A | 3/1955 | Schneider ................. 260/78.3 |
| 2,869,642 A | 1/1959 | McKay et al. |
| 3,047,067 A | 7/1962 | Williams et al. .............. 166/33 |
| 3,052,298 A | 9/1962 | Malott |
| 3,070,165 A | 12/1962 | Stratton |
| 3,123,138 A | 3/1964 | Robichaux ................. 166/33 |
| 3,173,484 A | 3/1965 | Huitt et al. |
| 3,176,768 A | 4/1965 | Brandt et al. ................. 166/33 |
| 3,189,091 A * | 6/1965 | Bearden et al. ............. 166/295 |
| 3,195,635 A | 7/1965 | Fast |
| 3,199,590 A | 8/1965 | Young ......................... 166/33 |
| 3,272,650 A | 9/1966 | MacVittie .................... 134/7 |
| 3,297,086 A * | 1/1967 | Spain .......................... 166/295 |
| 3,302,719 A | 2/1967 | Fischer |
| 3,308,885 A | 3/1967 | Sandiford .................... 166/33 |
| 3,308,886 A | 3/1967 | Evans |
| 3,316,965 A | 5/1967 | Watanabe ................... 166/33 |
| 3,329,204 A | 7/1967 | Brieger |
| 3,336,980 A | 8/1967 | Rike |
| 3,364,995 A | 1/1968 | Atkins et al. |
| 3,366,178 A | 1/1968 | Malone et al. |
| 3,375,872 A | 4/1968 | McLaughlin et al. .......... 166/29 |
| 3,378,074 A | 4/1968 | Kiel |
| 3,404,735 A | 10/1968 | Young et al. ................... 166/33 |
| 3,415,320 A | 12/1968 | Young ......................... 166/33 |
| 3,419,073 A * | 12/1968 | Brooks, Jr. ................. 166/295 |
| 3,443,386 A * | 5/1969 | Copeland et al. ............ 405/264 |
| 3,455,390 A | 7/1969 | Gallus |
| 3,478,824 A | 11/1969 | Hess et al. |
| 3,481,403 A | 12/1969 | Gidley et al. |
| 3,481,404 A * | 12/1969 | Gidley ........................ 166/307 |
| 3,489,222 A | 1/1970 | Millhone et al. |
| 3,492,147 A | 1/1970 | Young et al. ............... 117/62.2 |
| 3,525,398 A | 8/1970 | Fisher |
| 3,565,176 A | 2/1971 | Clifford |
| 3,592,266 A | 7/1971 | Tinsley |
| 3,659,651 A | 5/1972 | Graham ....................... 166/280 |
| 3,681,287 A | 8/1972 | Brown et al. .................. 260/67 |
| 3,708,013 A | 1/1973 | Dismukes |
| 3,709,298 A | 1/1973 | Pramann |
| 3,709,641 A | 1/1973 | Sarem |
| 3,741,308 A | 6/1973 | Veley |
| 3,754,598 A | 8/1973 | Holloway, Jr. .............. 166/249 |
| 3,765,804 A | 10/1973 | Brandon ..................... 417/540 |
| 3,768,564 A | 10/1973 | Knox et al. .................. 166/307 |
| 3,769,070 A | 10/1973 | Schitt |
| 3,784,585 A | 1/1974 | Schmitt et al. .............. 260/861 |
| 3,819,525 A | 6/1974 | Hattenbrun ................. 252/132 |
| 3,828,854 A | 8/1974 | Templeton et al. .......... 166/307 |
| 3,842,911 A | 10/1974 | Know et al. .................. 166/307 |
| 3,850,247 A | 11/1974 | Tinsley |
| 3,854,533 A | 12/1974 | Gurley et al. ................ 166/276 |
| 3,857,444 A | 12/1974 | Copeland ..................... 166/276 |
| 3,861,467 A | 1/1975 | Harnsberger |
| 3,863,709 A | 2/1975 | Fitch ............................. 165/1 |
| 3,868,998 A | 3/1975 | Lybarger et al. ............ 166/278 |
| 3,888,311 A | 6/1975 | Cooke, Jr. .................... 166/280 |

(Continued)

FOREIGN PATENT DOCUMENTS

CA    2063877    5/2003

(Continued)

OTHER PUBLICATIONS

U.S. Appl. No. 10/603,492, filed Jun. 25, 2003, Nguyen et al.

(Continued)

*Primary Examiner*—George Suchfield
(74) *Attorney, Agent, or Firm*—Robert A. Kent; Baker Botts LLP

(57) ABSTRACT

Methods of enhancing uniform placement of a resin in a subterranean formation comprising: introducing a preflush fluid comprising an oil-soluble diverting agent into a portion of a subterranean formation; introducing a resin and an aqueous soluble diverting agent into at least a portion of the subterranean formation; allowing the oil-soluble diverting agent to at least partially dissolve; and allowing the resin to at least partially consolidate at least a portion of the subterranean formation. Optionally, afterflush fluids may be used as desired.

19 Claims, No Drawings

U.S. PATENT DOCUMENTS

| | | | |
|---|---|---|---|
| 3,912,692 A | 10/1975 | Casey et al. | 260/78.3 |
| 3,933,205 A | 1/1976 | Kiel | |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |
| 4,000,781 A | 1/1977 | Knapp | |
| 4,008,763 A | 2/1977 | Lowe et al. | 166/253 |
| 4,015,995 A | 4/1977 | Hess | 106/287 |
| 4,018,285 A | 4/1977 | Watkins et al. | |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,060,988 A | 12/1977 | Arnold | |
| 4,068,718 A | 1/1978 | Cooke, Jr. et al. | |
| 4,070,865 A | 1/1978 | McLaughlin | 61/36 |
| 4,074,760 A | 2/1978 | Copeland et al. | 166/276 |
| 4,085,801 A | 4/1978 | Sifferman et al. | 166/295 |
| 4,085,802 A | 4/1978 | Sifferman et al. | |
| 4,089,437 A | 5/1978 | Chutter et al. | |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,247,430 A | 1/1981 | Constien | |
| 4,259,205 A | 3/1981 | Murphey | |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,392,988 A | 7/1983 | Dobson et al. | |
| 4,399,866 A | 8/1983 | Dearth | |
| 4,415,805 A | 11/1983 | Fertl et al. | 250/260 |
| 4,428,427 A | 1/1984 | Friedman | |
| 4,439,489 A | 3/1984 | Johnson et al. | 428/404 |
| 4,441,556 A | 4/1984 | Powers et al. | |
| 4,443,347 A | 4/1984 | Underdown et al. | 252/8.5 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,585,064 A | 4/1986 | Graham et al. | 166/280 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,670,501 A | 6/1987 | Dymond et al. | |
| 4,675,140 A | 6/1987 | Sparks et al. | 264/4.3 |
| 4,681,165 A * | 7/1987 | Bannister | 166/312 |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,772,646 A | 9/1988 | Harms et al. | |
| 4,777,200 A | 10/1988 | Dymond et al. | |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,070 A | 6/1989 | Sharp | |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,875,525 A | 10/1989 | Mana | |
| 4,886,354 A | 12/1989 | Welch et al. | 356/70 |
| 4,888,240 A | 12/1989 | Graham et al. | 428/403 |
| 4,892,147 A | 1/1990 | Jennings, Jr. et al. | |
| 4,895,207 A | 1/1990 | Friedman et al. | 166/276 |
| 4,898,750 A | 2/1990 | Friedman et al. | |
| 4,903,770 A | 2/1990 | Friedman et al. | 166/288 |
| 4,921,576 A | 5/1990 | Hurd | |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,984,635 A | 1/1991 | Cullick et al. | |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,056,597 A | 10/1991 | Stowe, III et al. | |
| 5,082,056 A | 1/1992 | Tackett, Jr. | 166/295 |
| 5,095,987 A | 3/1992 | Weaver et al. | |
| 5,105,886 A | 4/1992 | Strubhar et al. | |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredickson | 166/307 |
| 5,244,362 A | 9/1993 | Conally | |
| 5,247,059 A | 9/1993 | Gruber et al. | 528/354 |
| 5,249,627 A | 10/1993 | Harms et al. | |
| 5,249,628 A | 10/1993 | Surjaatmadja | 166/305 |
| 5,256,729 A | 10/1993 | Kutts et al. | 524/700 |
| 5,265,678 A | 11/1993 | Grundmann | |
| 5,273,115 A | 12/1993 | Spafford | 166/281 |
| 5,278,203 A | 1/1994 | Harms | |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |

| | | | |
|---|---|---|---|
| 5,358,051 A | 10/1994 | Rodrigues .................. 166/295 |
| 5,359,026 A | 10/1994 | Gruber ........................ 528/354 |
| 5,360,068 A | 11/1994 | Sprunt et al. ............... 166/259 |
| 5,361,856 A | 11/1994 | Surjaatmajda et al. ........ 175/67 |
| 5,363,916 A | 11/1994 | Himes et al. ............... 166/276 |
| 5,373,901 A | 12/1994 | Norman et al. ............. 166/300 |
| 5,377,756 A | 1/1995 | Northrop et al. |
| 5,377,759 A | 1/1995 | Surles ........................ 166/295 |
| 5,381,864 A | 1/1995 | Nguyen et al. ............... 166/280 |
| 5,386,874 A | 2/1995 | Laramay et al. ............. 166/300 |
| 5,388,648 A | 2/1995 | Jordan, Jr. .................... 166/380 |
| 5,390,741 A | 2/1995 | Payton et al. |
| 5,393,810 A | 2/1995 | Harris et al. .................. 524/56 |
| 5,396,957 A | 3/1995 | Surjaatmadja et al. ...... 166/308 |
| 5,402,846 A | 4/1995 | Jennings, Jr. et al. ........ 166/259 |
| 5,403,822 A | 4/1995 | Mueller et al. |
| 5,420,174 A | 5/1995 | Dewprashad |
| 5,422,183 A | 6/1995 | Sinclair et al. ............... 428/403 |
| 5,423,381 A | 6/1995 | Surles et al. ................. 166/295 |
| 5,439,055 A | 8/1995 | Card et al. .................. 166/280 |
| 5,460,226 A | 10/1995 | Lawton et al. ............. 166/300 |
| 5,464,060 A | 11/1995 | Hale et al. .................. 166/293 |
| 5,475,080 A | 12/1995 | Gruber et al. ................ 528/354 |
| 5,484,881 A | 1/1996 | Gruber et al. ................ 528/54 |
| 5,492,177 A | 2/1996 | Yeh et al. |
| 5,492,178 A | 2/1996 | Nguyen et al. |
| 5,494,103 A | 2/1996 | Surjaatmadja et al. ...... 166/222 |
| 5,494,178 A | 2/1996 | Nguyen et al. ............... 166/276 |
| 5,497,830 A | 3/1996 | Boles et al. ................. 166/300 |
| 5,498,280 A | 3/1996 | Fistner et al. ................ 106/19 |
| 5,499,678 A | 3/1996 | Surjaatmadja et al. ...... 166/298 |
| 5,501,275 A | 3/1996 | Card et al. .................. 166/280 |
| 5,505,787 A | 4/1996 | Yamaguchi .................... 134/4 |
| 5,512,071 A | 4/1996 | Yam et al. ...................... 51/307 |
| 5,520,250 A | 5/1996 | Harry et al. .................. 166/278 |
| 5,522,460 A | 6/1996 | Shu ............................ 166/295 |
| 5,529,123 A | 6/1996 | Carpenter et al. ............. 166/293 |
| 5,531,274 A | 7/1996 | Bienvenu, Jr. ............... 166/280 |
| 5,536,807 A | 7/1996 | Gruber et al. ................ 528/354 |
| 5,545,824 A | 8/1996 | Stengel et al. ............... 524/590 |
| 5,547,023 A | 8/1996 | McDaniel et al. ........... 166/280 |
| 5,551,513 A | 9/1996 | Suries et al. ................. 166/278 |
| 5,551,514 A | 9/1996 | Nelson et al. ............... 166/280 |
| 5,582,249 A | 12/1996 | Caveny et al. ............... 166/276 |
| 5,582,250 A | 12/1996 | Constein ..................... 166/280 |
| 5,588,488 A | 12/1996 | Vijn et al. ................... 166/293 |
| 5,591,700 A | 1/1997 | Harris et al. ................. 507/204 |
| 5,594,095 A | 1/1997 | Gruber et al. ................ 528/354 |
| 5,595,245 A | 1/1997 | Scott, III ................. 166/250.1 |
| 5,597,784 A | 1/1997 | Sinclair et al. |
| 5,604,184 A | 2/1997 | Ellis et al. .................. 507/117 |
| 5,604,186 A | 2/1997 | Hunt et al. .................. 507/204 |
| 5,609,207 A | 3/1997 | Dewprashad et al. ........ 166/276 |
| 5,620,049 A | 4/1997 | Gipson et al. ............... 166/248 |
| 5,639,806 A | 6/1997 | Johnson et al. ............. 523/208 |
| 5,663,123 A | 9/1997 | Goodhue, Jr. et al. |
| 5,670,473 A | 9/1997 | Scepanski ................... 510/445 |
| 5,692,566 A | 12/1997 | Surles ........................ 166/295 |
| 5,697,440 A | 12/1997 | Weaver et al. ............... 166/281 |
| 5,697,448 A | 12/1997 | Johnson |
| 5,698,322 A | 12/1997 | Tsai et al. .................... 428/373 |
| 5,701,956 A | 12/1997 | Hardy et al. |
| 5,712,314 A | 1/1998 | Surles et al. .................. 521/41 |
| 5,732,364 A | 3/1998 | Kalb et al. ...................... 588/8 |
| 5,738,136 A | 4/1998 | Rosenberg |
| 5,765,642 A | 6/1998 | Surjaatmadja ............... 166/297 |
| 5,775,425 A | 7/1998 | Weaver et al. ............... 166/276 |
| 5,782,300 A | 7/1998 | James et al. ................. 166/278 |
| 5,783,822 A | 7/1998 | Buchanan et al. ........... 250/259 |
| 5,787,986 A | 8/1998 | Weaver et al. ............... 166/280 |
| 5,791,415 A | 8/1998 | Nguyen et al. ............... 166/280 |
| 5,799,734 A | 9/1998 | Norman et al. ............. 166/278 |
| 5,806,593 A | 9/1998 | Suries ........................ 166/270 |
| 5,830,987 A | 11/1998 | Smith ......................... 528/332 |
| 5,833,000 A | 11/1998 | Weaver et al. ............... 166/276 |
| 5,833,361 A | 11/1998 | Funk ............................. 366/80 |
| 5,836,391 A | 11/1998 | Jonasson et al. ............. 166/295 |
| 5,836,392 A | 11/1998 | Urlwin-Smith ............. 166/295 |
| 5,836,393 A | 11/1998 | Johnson |
| 5,837,656 A | 11/1998 | Sinclair et al. ............... 507/220 |
| 5,837,785 A | 11/1998 | Kinsho et al. ............... 525/527 |
| 5,839,510 A | 11/1998 | Weaver et al. ............... 166/276 |
| 5,840,784 A | 11/1998 | Funkhouser et al. ........ 523/130 |
| 5,849,401 A | 12/1998 | El-Afandi et al. ........... 428/215 |
| 5,849,590 A | 12/1998 | Anderson, II et al. ......... 436/27 |
| 5,853,048 A | 12/1998 | Weaver et al. ............... 166/279 |
| 5,864,003 A | 1/1999 | Qureshi et al. .............. 528/141 |
| 5,865,936 A | 2/1999 | Edelman et al. ............. 156/310 |
| 5,871,049 A | 2/1999 | Weaver et al. ............... 166/276 |
| 5,873,413 A | 2/1999 | Chatterji et al. .............. 166/293 |
| 5,875,844 A | 3/1999 | Chatterji et al. .............. 166/293 |
| 5,875,845 A | 3/1999 | Chatterji et al. .............. 166/293 |
| 5,875,846 A | 3/1999 | Chatterji et al. .............. 166/293 |
| 5,893,383 A | 4/1999 | Fracteau ..................... 137/14 |
| 5,893,416 A | 4/1999 | Read .......................... 166/304 |
| 5,901,789 A | 5/1999 | Donnelly et al. |
| 5,908,073 A | 6/1999 | Nguyen et al. ............... 166/276 |
| 5,911,282 A | 6/1999 | Onan et al. .................... 175/72 |
| 5,916,933 A | 6/1999 | Johnson et al. ............. 523/208 |
| 5,921,317 A | 7/1999 | Dewprashad et al. ........ 166/208 |
| 5,924,488 A | 7/1999 | Nguyen et al. ............... 166/280 |
| 5,929,437 A | 7/1999 | Elliott et al. ................. 250/259 |
| 5,944,105 A | 8/1999 | Nguyen ...................... 166/278 |
| 5,944,106 A | 8/1999 | Dalrymple et al. |
| 5,945,387 A | 8/1999 | Chatterji et al. .............. 507/224 |
| 5,948,734 A | 9/1999 | Sinclair et al. ............... 507/219 |
| 5,957,204 A | 9/1999 | Chatterji et al. .............. 166/295 |
| 5,960,784 A | 10/1999 | Ryan |
| 5,960,877 A | 10/1999 | Funkhouser ................. 166/270 |
| 5,960,878 A | 10/1999 | Nguyen et al. |
| 5,960,880 A | 10/1999 | Nguyen et al. ............... 166/280 |
| 5,964,291 A | 10/1999 | Bourne et al. ............... 166/279 |
| 5,969,006 A | 10/1999 | Onan et al. .................. 523/166 |
| 5,969,823 A | 10/1999 | Wurz et al. |
| 5,977,283 A | 11/1999 | Rossitto ....................... 528/44 |
| 5,994,785 A | 11/1999 | Higuchi et al. .............. 527/789 |
| RE36,466 E | 12/1999 | Nelson et al. ............... 166/280 |
| 6,003,600 A | 12/1999 | Nguyen et al. ............... 166/281 |
| 6,004,400 A | 12/1999 | Bishop et al. ................ 134/2 |
| 6,006,835 A | 12/1999 | Onan et al. .................. 166/295 |
| 6,006,836 A | 12/1999 | Chatterji et al. .............. 166/295 |
| 6,012,524 A | 1/2000 | Chatterji et al. .............. 166/295 |
| 6,016,870 A * | 1/2000 | Dewprashad et al. ........ 166/295 |
| 6,024,170 A | 2/2000 | McCabe et al. ............. 166/300 |
| 6,028,113 A | 2/2000 | Scepanski ................... 514/643 |
| 6,028,534 A | 2/2000 | Ciglenec et al. ............. 340/856.2 |
| 6,040,398 A | 3/2000 | Kinsho et al. ............... 525/527 |
| 6,047,772 A | 4/2000 | Weaver et al. ............... 166/276 |
| 6,059,034 A | 5/2000 | Rickards et al. ............. 166/280 |
| 6,059,035 A | 5/2000 | Chatterji et al. .............. 166/293 |
| 6,059,036 A | 5/2000 | Chatterji et al. .............. 166/294 |
| 6,063,738 A | 5/2000 | Chatterji et al. |
| 6,068,055 A | 5/2000 | Chatterji et al. .............. 166/293 |
| 6,069,117 A | 5/2000 | Onan et al. .................. 507/202 |
| 6,074,739 A | 6/2000 | Katagiri ...................... 428/323 |
| 6,079,492 A | 6/2000 | Hoogteijling et al. ........ 166/276 |
| 6,098,711 A | 8/2000 | Chatterji et al. .............. 166/294 |
| 6,114,410 A | 9/2000 | Betzold ....................... 523/130 |
| 6,123,871 A | 9/2000 | Carroll ..................... 252/301.36 |
| 6,123,965 A | 9/2000 | Jacon et al. .................. 424/489 |
| 6,124,246 A | 9/2000 | Heathman et al. ........... 507/219 |
| 6,130,286 A | 10/2000 | Thomas et al. .............. 524/507 |
| 6,131,661 A | 10/2000 | Conner et al. |
| 6,135,987 A | 10/2000 | Tsai et al. .................... 604/365 |
| 6,140,446 A | 10/2000 | Fujiki et al. .................. 528/15 |
| 6,143,698 A | 11/2000 | Murphey et al. |

| | | | |
|---|---|---|---|
| 6,148,911 A | 11/2000 | Gipson et al. ............... 166/248 |
| 6,152,234 A | 11/2000 | Newhouse et al. .......... 166/403 |
| 6,162,766 A | 12/2000 | Muir et al. .................. 507/267 |
| 6,165,947 A | 12/2000 | Chang et al. |
| 6,169,058 B1 | 1/2001 | Le et al. ...................... 507/222 |
| 6,172,011 B1 | 1/2001 | Card et al. ................... 507/204 |
| 6,172,077 B1 | 1/2001 | Curtis et al. ................. 514/278 |
| 6,176,315 B1 | 1/2001 | Reddy et al. ................. 166/295 |
| 6,177,484 B1 | 1/2001 | Surles ......................... 523/131 |
| 6,184,311 B1 | 2/2001 | O'Keefe et al. ............. 525/438 |
| 6,186,228 B1 | 2/2001 | Wegener et al. |
| 6,187,834 B1 | 2/2001 | Thayer et al. ................. 522/15 |
| 6,187,839 B1 | 2/2001 | Eoff ............................ 523/130 |
| 6,189,615 B1 | 2/2001 | Sydansk ...................... 166/270 |
| 6,192,985 B1 | 2/2001 | Hinkel et al. ................ 166/280 |
| 6,192,986 B1 | 2/2001 | Urlwin-Smith ............. 166/295 |
| 6,196,317 B1 | 3/2001 | Hardy ......................... 166/295 |
| 6,202,751 B1 | 3/2001 | Chatterji et al. ............. 166/276 |
| 6,209,643 B1 | 4/2001 | Nguyen et al. .............. 166/276 |
| 6,209,644 B1 | 4/2001 | Brunet ......................... 166/297 |
| 6,209,646 B1 | 4/2001 | Reddy et al. ................ 166/300 |
| 6,210,471 B1 | 4/2001 | Craig ........................ 106/31.08 |
| 6,214,773 B1 | 4/2001 | Harris et al. ................. 507/219 |
| 6,231,644 B1 | 5/2001 | Chatterji et al. ............. 106/724 |
| 6,234,251 B1 | 5/2001 | Chatterji et al. ............. 252/512 |
| 6,238,597 B1 | 5/2001 | Yim et al. .................... 252/512 |
| 6,241,019 B1 | 6/2001 | Davidson et al. ............ 166/249 |
| 6,242,390 B1 | 6/2001 | Mitchell et al. ............. 507/211 |
| 6,244,344 B1 | 6/2001 | Chatterji et al. ............. 166/295 |
| 6,257,335 B1 | 7/2001 | Nguyen et al. .............. 166/280 |
| 6,260,622 B1 | 7/2001 | Blok et al. ................. 166/305.1 |
| 6,271,181 B1 | 8/2001 | Chatterji et al. ............. 507/219 |
| 6,274,650 B1 | 8/2001 | Cui .............................. 523/457 |
| 6,279,652 B1 | 8/2001 | Chatterji et al. ............. 166/194 |
| 6,279,656 B1 | 8/2001 | Sinclair et al. ............... 166/310 |
| 6,283,214 B1 | 9/2001 | Guinot et al. ................ 166/297 |
| 6,302,207 B1 | 10/2001 | Nguyen et al. .............. 166/276 |
| 6,306,998 B1 | 10/2001 | Kimura et al. |
| 6,310,008 B1 | 10/2001 | Rietjens |
| 6,311,773 B1 * | 11/2001 | Todd et al. ................ 166/280.2 |
| 6,315,040 B1 | 11/2001 | Donnelly |
| 6,321,841 B1 | 11/2001 | Eoff et al. .................... 166/291 |
| 6,323,307 B1 | 11/2001 | Bigg et al. ................... 528/354 |
| 6,326,458 B1 | 12/2001 | Gruber et al. ................ 528/354 |
| 6,328,105 B1 | 12/2001 | Betzold ........................ 166/280 |
| 6,328,106 B1 | 12/2001 | Griffith et al. ............... 166/295 |
| 6,330,916 B1 | 12/2001 | Rickards et al. ............. 166/280 |
| 6,330,917 B2 | 12/2001 | Chatterji et al. ............. 166/295 |
| 6,342,467 B1 | 1/2002 | Chang et al. |
| 6,350,309 B2 | 2/2002 | Chatterji et al. ............. 106/677 |
| 6,357,527 B1 | 3/2002 | Norman et al. .............. 166/300 |
| 6,364,018 B1 | 4/2002 | Brannon et al. ........... 166/280.2 |
| 6,364,945 B1 | 4/2002 | Chatterji et al. ............. 106/677 |
| 6,367,165 B1 | 4/2002 | Huttlin .......................... 34/582 |
| 6,367,549 B1 | 4/2002 | Chatterji et al. ............. 166/292 |
| 6,372,678 B1 | 4/2002 | Youngsman et al. ........ 504/128 |
| 6,376,571 B1 | 4/2002 | Chawla et al. ................ 522/64 |
| 6,387,986 B1 | 5/2002 | Moradi-Araghi et al. .... 523/211 |
| 6,390,195 B1 | 5/2002 | Nguyen et al. .............. 166/276 |
| 6,394,181 B2 | 5/2002 | Schnatzmeyer et al. |
| 6,401,817 B1 | 6/2002 | Griffith et al. ............... 166/295 |
| 6,405,796 B1 | 6/2002 | Meyer et al. |
| 6,405,797 B2 | 6/2002 | Davidson et al. ............ 166/249 |
| 6,406,789 B1 | 6/2002 | McDaniel et al. ........... 428/403 |
| 6,408,943 B1 | 6/2002 | Schultz et al. ............... 166/285 |
| 6,415,509 B1 | 7/2002 | Echols et al. |
| 6,422,183 B1 | 7/2002 | Kato |
| 6,422,314 B1 | 7/2002 | Todd et al. ................... 166/312 |
| 6,439,309 B1 | 8/2002 | Matherly et al. ............. 166/276 |
| 6,439,310 B1 | 8/2002 | Scott, III et al. ............. 166/308 |
| 6,440,255 B1 | 8/2002 | Kohlhammer et al. ....... 156/283 |
| 6,446,727 B1 | 9/2002 | Zemlak et al. ............... 166/308 |
| 6,448,206 B1 | 9/2002 | Griffith et al. ............... 507/219 |
| 6,450,260 B1 | 9/2002 | James et al. ................. 166/277 |
| 6,454,003 B1 | 9/2002 | Chang et al. ................. 166/270 |
| 6,457,518 B1 | 10/2002 | Castano-Mears et al. |
| 6,458,885 B1 | 10/2002 | Stengel et al. ............... 524/507 |
| 6,478,092 B2 | 11/2002 | Voll et al. |
| 6,485,947 B1 | 11/2002 | Rajgarhia et al. ............ 435/139 |
| 6,488,091 B1 | 12/2002 | Weaver et al. ............... 166/300 |
| 6,488,763 B2 | 12/2002 | Brothers et al. .............. 106/692 |
| 6,494,263 B2 | 12/2002 | Todd ........................... 166/312 |
| 6,503,870 B2 | 1/2003 | Griffith et al. ............... 507/219 |
| 6,508,305 B1 | 1/2003 | Brannon et al. ............. 166/293 |
| 6,510,896 B2 | 1/2003 | Bode et al. |
| 6,520,255 B2 | 2/2003 | Tolman et al. |
| 6,527,051 B1 | 3/2003 | Reddy et al. ................ 166/300 |
| 6,528,157 B1 | 3/2003 | Hussain et al. .............. 428/325 |
| 6,531,427 B1 | 3/2003 | Shuchart et al. ............. 507/267 |
| 6,534,449 B1 | 3/2003 | Gilmour et al. |
| 6,536,939 B1 | 3/2003 | Blue |
| 6,538,576 B1 | 3/2003 | Schultz et al. ............ 340/859.6 |
| 6,543,545 B1 | 4/2003 | Chatterji et al. ............. 166/381 |
| 6,550,959 B2 | 4/2003 | Huber et al. |
| 6,552,333 B1 | 4/2003 | Storm et al. .............. 250/269.3 |
| 6,554,071 B1 | 4/2003 | Reddy et al. ................ 166/293 |
| 6,555,507 B2 | 4/2003 | Chatterji et al. ............. 507/219 |
| 6,569,814 B1 | 5/2003 | Brady et al. ................. 507/201 |
| 6,582,819 B2 | 6/2003 | McDaniel et al. ........... 428/402 |
| 6,588,926 B2 | 7/2003 | Huber et al. |
| 6,588,928 B2 | 7/2003 | Huber et al. |
| 6,593,402 B2 | 7/2003 | Chatterji et al. ................. 524/7 |
| 6,599,863 B1 | 7/2003 | Palmer et al. ................ 507/219 |
| 6,608,162 B1 | 8/2003 | Chiu et al. ................... 528/129 |
| 6,609,578 B2 | 8/2003 | Patel et al. |
| 6,616,320 B2 | 9/2003 | Huber et al. ............... 366/156.2 |
| 6,620,857 B2 | 9/2003 | Valet ............................ 522/42 |
| 6,626,241 B2 | 9/2003 | Nguyen ....................... 166/278 |
| 6,632,527 B1 | 10/2003 | McDaniel et al. ........... 428/402 |
| 6,632,778 B1 | 10/2003 | Ayoub et al. ................ 507/202 |
| 6,632,892 B2 | 10/2003 | Rubinsztajn et al. ........ 525/476 |
| 6,642,309 B2 | 11/2003 | Komitsu et al. ............. 525/100 |
| 6,648,501 B2 | 11/2003 | Huber et al. ................. 366/301 |
| 6,659,179 B2 | 12/2003 | Nguyen ....................... 166/227 |
| 6,664,343 B2 | 12/2003 | Narisawa et al. ............ 525/474 |
| 6,667,279 B1 | 12/2003 | Hessert et al. ............... 507/225 |
| 6,668,926 B2 | 12/2003 | Nguyen et al. .............. 166/280 |
| 6,669,771 B2 | 12/2003 | Tokiwa et al. ............. 106/162.7 |
| 6,677,426 B2 | 1/2004 | Noro et al. |
| 6,681,856 B1 | 1/2004 | Chatterji et al. ............. 166/294 |
| 6,686,328 B1 | 2/2004 | Binder ......................... 510/446 |
| 6,705,400 B1 | 3/2004 | Nguyen et al. .............. 166/281 |
| 6,705,440 B2 | 3/2004 | Nugyen et al. |
| 6,710,019 B1 | 3/2004 | Sawdon et al. .............. 507/136 |
| 6,713,170 B1 | 3/2004 | Kaneko et al. .............. 428/323 |
| 6,725,926 B2 | 4/2004 | Nguyen et al. ............ 166/254.1 |
| 6,725,930 B2 | 4/2004 | Boney et al. |
| 6,725,931 B2 | 4/2004 | Nguyen et al. ........... 166/280.2 |
| 6,729,404 B2 | 5/2004 | Nguyen et al. ........... 166/280.2 |
| 6,729,405 B2 | 5/2004 | DiLullo et al. |
| 6,732,800 B2 | 5/2004 | Acock et al. ................. 166/308 |
| 6,745,159 B1 | 6/2004 | Todd et al. ..................... 703/10 |
| 6,749,025 B1 | 6/2004 | Brannon et al. ........... 166/305.1 |
| 6,763,888 B1 | 7/2004 | Harris et al. ............... 166/305.1 |
| 6,764,981 B1 | 7/2004 | Eoff et al. .................... 507/110 |
| 6,766,858 B2 | 7/2004 | Nguyen et al. .............. 166/300 |
| 6,776,235 B1 | 8/2004 | England |
| 6,776,236 B1 | 8/2004 | Nguyen ....................... 166/279 |
| 6,832,650 B2 | 12/2004 | Nguyen et al. .............. 166/279 |
| 6,832,655 B2 | 12/2004 | Ravensbergen et al. |
| 6,837,309 B2 | 1/2005 | Boney et al. |
| 6,851,474 B2 | 2/2005 | Nguyen ....................... 166/279 |
| 6,866,099 B2 | 3/2005 | Nguyen |
| 6,881,709 B2 | 4/2005 | Nelson et al. |
| 6,887,834 B2 | 5/2005 | Nguyen et al. .............. 507/221 |
| 6,962,200 B2 | 11/2005 | Nguyen et al. |

| Patent No. | Date | Inventor | Class |
|---|---|---|---|
| 6,978,836 B2 | 12/2005 | Nguyen et al. | 166/295 |
| 6,997,259 B2 | 2/2006 | Nguyen | |
| 7,013,976 B2 | 3/2006 | Nguyen et al. | |
| 7,017,665 B2 | 3/2006 | Nguyen | |
| 7,025,134 B2 | 4/2006 | Byrd et al. | |
| 7,028,774 B2 | 4/2006 | Nguyen et al. | |
| 7,032,667 B2 | 4/2006 | Nguyen et al. | |
| 7,036,589 B2 | 5/2006 | Nguyen | |
| 7,040,403 B2 | 5/2006 | Nguyen et al. | |
| 7,059,406 B2 | 6/2006 | Nguyen | |
| 7,063,150 B2 | 6/2006 | Slabaugh et al. | |
| 7,066,258 B2 | 6/2006 | Justus et al. | |
| 7,073,581 B2 | 7/2006 | Nguyen et al. | |
| 7,080,688 B2 | 7/2006 | Todd et al. | |
| 7,081,439 B2 | 7/2006 | Sullivan et al. | |
| 7,093,658 B2 | 8/2006 | Chatterji et al. | |
| 7,104,325 B2 | 9/2006 | Nguyen et al. | |
| 7,114,560 B2 | 10/2006 | Nguyen et al. | |
| 7,114,570 B2 | 10/2006 | Nguyen et al. | |
| 7,117,942 B2 | 10/2006 | Dalrymple et al. | |
| 7,131,491 B2 | 11/2006 | Blauch et al. | |
| 7,153,575 B2 | 12/2006 | Anderson et al. | |
| 7,156,194 B2 | 1/2007 | Nguyen | |
| 7,178,596 B2 | 2/2007 | Blauch et al. | |
| 7,204,311 B2 | 4/2007 | Welton et al. | |
| 7,210,528 B1 | 5/2007 | Brannon et al. | |
| 7,216,711 B2 | 5/2007 | Nguyen et al. | |
| 7,252,146 B2 | 8/2007 | Slabaugh et al. | |
| 7,261,156 B2 | 8/2007 | Nguyen et al. | |
| 7,264,051 B2 | 9/2007 | Nguyen et al. | |
| 7,264,052 B2 | 9/2007 | Nguyen et al. | |
| 7,267,717 B2 | 9/2007 | Watanabe et al. | |
| 7,273,099 B2 | 9/2007 | East, Jr. et al. | |
| 7,281,581 B2 | 10/2007 | Nguyen et al. | |
| 7,306,037 B2 | 12/2007 | Nguyen et al. | |
| 7,343,973 B2 | 3/2008 | Dusterhoft et al. | |
| 2001/0016562 A1 | 8/2001 | Muir et al. | 507/201 |
| 2002/0036088 A1 | 3/2002 | Todd | |
| 2002/0043370 A1 | 4/2002 | Poe | 166/250.07 |
| 2002/0048676 A1 | 4/2002 | McDaniel et al. | 428/404 |
| 2002/0070020 A1 | 6/2002 | Nguyen | 166/295 |
| 2002/0104217 A1 | 8/2002 | Echols et al. | |
| 2002/0160920 A1 | 10/2002 | Dawson et al. | |
| 2002/0169085 A1 | 11/2002 | Miller et al. | |
| 2002/0189808 A1 | 12/2002 | Nguyen et al. | |
| 2003/0006036 A1 | 1/2003 | Malone et al. | 166/250.12 |
| 2003/0013871 A1 | 1/2003 | Mallon et al. | |
| 2003/0060374 A1 | 3/2003 | Cooke, Jr. | 507/200 |
| 2003/0106690 A1 | 6/2003 | Boney et al. | |
| 2003/0114314 A1 | 6/2003 | Ballard et al. | 507/100 |
| 2003/0114317 A1 | 6/2003 | Benton et al. | |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1 | 10/2003 | Nguyen et al. | 166/308 |
| 2003/0196805 A1 | 10/2003 | Boney et al. | 166/280 |
| 2003/0205376 A1 | 11/2003 | Ayoub et al. | 166/254.2 |
| 2003/0230408 A1 | 12/2003 | Acock et al. | 166/297 |
| 2003/0230431 A1 | 12/2003 | Reddy et al. | |
| 2003/0234103 A1 | 12/2003 | Lee et al. | 166/293 |
| 2004/0000402 A1 | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040712 A1 | 3/2004 | Ravi et al. | |
| 2004/0040713 A1 | 3/2004 | Nguyen et al. | 166/295 |
| 2004/0043906 A1 | 3/2004 | Heath et al. | |
| 2004/0045712 A1 | 3/2004 | Eoff et al. | |
| 2004/0048752 A1 | 3/2004 | Nguyen et al. | 507/269 |
| 2004/0055747 A1 | 3/2004 | Lee | 166/278 |
| 2004/0060702 A1 | 4/2004 | Kotlar et al. | |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0152602 A1 | 8/2004 | Boles | |
| 2004/0177961 A1 | 9/2004 | Nguyen et al. | 166/280.2 |
| 2004/0194960 A1 | 10/2004 | Nguyen et al. | |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256097 A1 | 12/2004 | Byrd et al. | 166/90.1 |
| 2004/0256099 A1 | 12/2004 | Nguyen et al. | 166/249 |
| 2004/0261993 A1 | 12/2004 | Nguyen | |
| 2004/0261995 A1 | 12/2004 | Nguyen et al. | 166/279 |
| 2004/0261997 A1 | 12/2004 | Nguyen et al. | 166/281 |
| 2004/0261999 A1 | 12/2004 | Nguyen | |
| 2005/0000694 A1 | 1/2005 | Dalrymple et al. | |
| 2005/0000731 A1 | 1/2005 | Nguyen et al. | 175/57 |
| 2005/0006093 A1 | 1/2005 | Nguyen et al. | 166/281 |
| 2005/0006095 A1 | 1/2005 | Justus et al. | 166/295 |
| 2005/0006096 A1 | 1/2005 | Nguyen et al. | 166/295 |
| 2005/0028976 A1 | 2/2005 | Nguyen | |
| 2005/0028979 A1 | 2/2005 | Brannon et al. | |
| 2005/0034862 A1 | 2/2005 | Nguyen | 166/281 |
| 2005/0034865 A1 | 2/2005 | Todd et al. | |
| 2005/0045326 A1 | 3/2005 | Nguyen | 166/278 |
| 2005/0045330 A1 | 3/2005 | Nguyen et al. | 166/281 |
| 2005/0045384 A1 | 3/2005 | Nguyen | 175/72 |
| 2005/0051322 A1 | 3/2005 | Nguyen et al. | 166/281 |
| 2005/0051331 A1 | 3/2005 | Nguyen et al. | 166/280.2 |
| 2005/0059555 A1 | 3/2005 | Dusterhoft et al. | 507/100 |
| 2005/0061509 A1 | 3/2005 | Nguyen | 166/307 |
| 2005/0092489 A1 | 5/2005 | Welton et al. | 166/280.2 |
| 2005/0126780 A1 | 6/2005 | Todd et al. | |
| 2005/0139359 A1 | 6/2005 | Maurer et al. | |
| 2005/0145385 A1 | 7/2005 | Nguyen | 166/279 |
| 2005/0173116 A1 | 8/2005 | Nguyen et al. | 166/280.2 |
| 2005/0178551 A1 | 8/2005 | Tolman et al. | |
| 2005/0194135 A1 | 9/2005 | Nguyen et al. | |
| 2005/0194136 A1 | 9/2005 | Nguyen et al. | |
| 2005/0194140 A1 | 9/2005 | Dalrymple et al. | |
| 2005/0194142 A1 | 9/2005 | Nguyen | 166/280.2 |
| 2005/0197258 A1 | 9/2005 | Nguyen | 507/209 |
| 2005/0207001 A1 | 9/2005 | Laufer et al. | |
| 2005/0257929 A1 | 11/2005 | Nguyen et al. | |
| 2005/0263283 A1 | 12/2005 | Nguyen | 166/281 |
| 2005/0267001 A1 | 12/2005 | Weaver et al. | |
| 2005/0269086 A1 | 12/2005 | Nguyen et al. | 166/281 |
| 2005/0269101 A1 | 12/2005 | Stegent et al. | |
| 2005/0274510 A1 | 12/2005 | Nguyen et al. | 166/250.12 |
| 2005/0274517 A1 | 12/2005 | Blauch et al. | 166/280.2 |
| 2005/0274520 A1 | 12/2005 | Nguyen et al. | |
| 2005/0277554 A1 | 12/2005 | Blauch et al. | 507/224 |
| 2005/0284632 A1 | 12/2005 | Dalrymple et al. | |
| 2005/0284637 A1 | 12/2005 | Stegent et al. | 166/308.1 |
| 2006/0048943 A1 | 3/2006 | Parker et al. | |
| 2006/0048944 A1 | 3/2006 | van Batenburg et al. | |
| 2006/0052251 A1 | 3/2006 | Anderson et al. | |
| 2006/0089266 A1 | 4/2006 | Dusterhoft et al. | |
| 2006/0113078 A1 | 6/2006 | Nguyen et al. | |
| 2006/0124303 A1 | 6/2006 | Nguyen et al. | |
| 2006/0124309 A1 | 6/2006 | Nguyen et al. | |
| 2006/0137875 A1 | 6/2006 | Dusterhoft et al. | |
| 2006/0157243 A1 | 7/2006 | Nguyen | |
| 2006/0175058 A1 | 8/2006 | Nguyen | |
| 2006/0219405 A1 | 10/2006 | Nguyen et al. | |
| 2006/0219408 A1 | 10/2006 | Nguyen et al. | |
| 2006/0234874 A1 | 10/2006 | Eoff et al. | |

| | | | |
|---|---|---|---|
| 2006/0240994 | A1 | 10/2006 | Eoff et al. |
| 2006/0240995 | A1 | 10/2006 | Rickman et al. |
| 2006/0260810 | A1 | 11/2006 | Weaver et al. |
| 2006/0260813 | A1 | 11/2006 | Welton et al. |
| 2006/0264332 | A1 | 11/2006 | Welton et al. |
| 2007/0007010 | A1 | 1/2007 | Welton et al. |
| 2007/0012445 | A1 | 1/2007 | Nguyen et al. |
| 2007/0114032 | A1 | 5/2007 | Stegent et al. |
| 2007/0131422 | A1 | 6/2007 | Gatlin et al. |
| 2007/0131425 | A1 | 6/2007 | Gatlin et al. |
| 2007/0251693 | A1* | 11/2007 | Cheramie et al. ........... 166/300 |

FOREIGN PATENT DOCUMENTS

| | | |
|---|---|---|
| EP | 0313243 B1 | 10/1988 |
| EP | 0528595 A1 | 8/1992 |
| EP | 0506934 | 10/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398460 A1 | 3/2004 |
| EP | 1403466 A2 | 3/2004 |
| EP | 1464789 A1 | 10/2004 |
| EP | 1607572 | 12/2005 |
| GB | 1107584 | 4/1965 |
| GB | 1264180 | 12/1969 |
| GB | 1292718 | 10/1972 |
| GB | 2298440 | 9/1996 |
| GB | 2382143 | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 03/027431 A2 | 4/2003 |
| WO | WO 2004/009956 | 1/2004 |
| WO | WO 2004/037946 A1 | 5/2004 |
| WO | WO 2004/038176 A1 | 5/2004 |
| WO | WO 2004/083600 | 9/2004 |
| WO | WO2004090281 | 10/2004 |
| WO | WO2004104368 | 12/2004 |
| WO | WO 2005/021928 A2 | 3/2005 |
| WO | WO2005080749 | 9/2005 |

OTHER PUBLICATIONS

U.S. Appl. No. 10/649,029, filed Aug. 27, 2003, Nguyen et al.
U.S. Appl. No. 10/727,365, filed Dec. 4, 2003, Reddy et al.
U.S. Appl. No. 10/853,879, filed May 26, 2004, Nguyen et al.
U.S. Appl. No. 10/861,829, filed Jun. 4, 2004, Stegent et al.
U.S. Appl. No. 10/868,593, filed Jun. 15, 2004, Nguyen et al.
U.S. Appl. No. 10/937,076, filed Sep. 9, 2004, Nguyen et al.
U.S. Appl. No. 10/944,973, filed Sep. 20, 2004, Nguyen et al.
U.S. Appl. No. 11/011,394, filed Dec. 12, 2004, Nguyen et al.
U.S. Appl. No. 11/035,833, filed Jan. 14, 2005, Nguyen.
U.S. Appl. No. 11/049,252, filed Feb. 2, 2005, Van Batenburg et al.
U.S. Appl. No. 11/053,280, filed Feb. 8, 2005, Nguyen.
U.S. Appl. No. 11/056,635, filed Feb. 11, 2005, Dusterhoft et al.

Halliburton, *CoalStim$^{SM}$ Service, Helps Boost Cash Flow From CBM Assets*, Stimulation, HO3679 10/03, 2003, Halliburton Communications.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.
Halliburton, *Expedite® Service, A Step-Change Improvement Over Conventional Proppant Flowback Control Systems. Provides Up to Three Times the Conductivity of RCPs.*, Stimulation, HO3296 05/04, 2004, Halliburton Communications.
Halliburton "*CobraFrac$^{SM}$ Service, Coiled Tubing Fracturing—Cost-Effective Method for Stimulating Untapped Reserves*", 2 pages, 2004.
Halliburton Cobra Frac Advertisement, 2001.
Halliburton "*SurgiFrac$^{SM}$ Service, a Quick and cost-Effective Method to Help Boost Production From Openhole Horizonal Completions*", 2002.
Halliburton, *SandWedge® NT Conductivity Enhancement System, Enhances Proppant Pack Conductivity and Helps Prevent Intrusion of Formation Material for Improved Long-Term Production*, Stimulation, HO2289 05/04, 2004, Halliburton Communications, 2004.
Almond et al., *Factors Affecting Proppant Flowback With Resin Coated Proppants*, SPE 30096, pp. 171-186, May 1995.
Nguyen et al., *A Novel, Approach For Enhancing Proppant Consolidation: Laboratory Testing And Field Applications*, SPE Paper No. 77748, 2002.
SPE 15547, *Field Application of Lignosulfonate Gels To Reduce Channeling*, South Swan Hills Miscible Unit, Alberta, Canada, by O.R. Wagner et al., 1986.
Owens et al., *Waterflood Pressure Pulsing for Fractured Reservoirs* SPE 1123, 1966.
Felsenthal et al., *Pressure Pulsing—An Improved Method of Waterflooding Fractured Reservoirs* SPE 1788, 1957.
Raza, "*Water and Gas Cyclic Pulsing Method for Improved Oil Recovery*", SPE 3005, 1971.
Peng et al., "*Pressure Pulsing Waterflooding in Dual Porosity Naturally Fractured Reservoirs*" SPE 17587, 1988.
Dusseault et al, "*Pressure Pulse Workovers in Heavy Oil*", SPE 79033, 2002.
Yang et al., "*Experimental Study on Fracture Initiation By Pressure Pulse*", SPE 63035, 2000.
Nguyen et al., *New Guidelines For Applying Curable Resin-Coated Proppants*, SPE Paper No. 39582, 1997.
Kazakov et al., "*Optimizing and Managing Coiled Tubing Frac Strings*" SPE 60747, 2000.
Advances in Polymer Science, vol. 157, "*Degradable Aliphatic Polyesters*" edited by A.-C. Alberston, pp. 1-138, 2001.
Gorman, *Plastic Electric: Lining up the Future of Conducting Polymers* Science News, vol. 163, May 17, 2003.
Gidley et al., "*Recent Advances in Hydraulic Fracturing*," Chapter 6, pp. 109-130, 1989.
Simmons et al., "*Poly(phenyllactide): Synthesis, Characterization, and Hydrolytic Degradation, Biomacromolecules*", vol. 2, No. 2, pp. 658-663, 2001.
Yin et al., "*Preparation and Characterization of Substituted Polylactides*", Americal Chemical Society, vol. 32, No. 23, pp. 7711-7718, 1999.
Yin et al., "*Synthesis and Properties of Polymers Derived from Substituted Lactic Acids*", American Chemical Society, Ch. 12, pp. 147-159, 2001.
Cantu et al., "*Laboratory and Field Evaluation of a Combined Fluid-Loss Control Additive and Gel Breaker for Fracturing Fluids*," SPE 18211, 1990.
Love et al., "*Selectively Placing Many Fractures in Openhole Horizontal Wells Improves Production*", SPE 50422, 1998.
McDaniel et al. "*Evolving New Stimulation Process Proves Highly Effective In Level 1 Dual-Lateral Completion*" SPE 78697, 2002.
Dechy-Cabaret et al., "*Controlled Ring-Operated Polymerization of Lactide and Glycolide*" American Chemical Society, Chemical Reviews, A-Z, AA-AD, 2004.
Funkhouser et al., "*Synthetic Polymer Fracturing Fluid For High-Temperature Applications*", SPE 80236, 2003.

Vichaibun et al., "*A New Assay for the Enzymatic Degradation of Polylactic Acid, Short Report*", ScienceAsia, vol. 29, pp. 297-300, 2003.

CDX Gas, CDX Solution, 2003, CDX, LLC, Available @ www.cdxgas.com/solution.html, printed pp. 1-2.

Halliburton brochure entitled "H2Zero™ Service Introducing The Next Generation of cost-Effective Conformance Control Solutions", 2002.

Halliburton brochure entitled INJECTROL® A Component: 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

12080647, Apr. 4, 2008; Dalrymple et al., filed Apr. 4, 2008.

"Santrol Bioballs"; http://www.fairmounminerals.com/.sub.—SANTROL/SANTROL%20Web%20Site/B.sub- .—TD.htm. cited by other, Sep. 30, 2004.

International Search Report and Opinion (PCT/GB2004/002412), Sep. 16, 2004.

International Search Report and Opinion (PCT/GB2005/003845), Jul. 31, 2006.

International Search Report and Opinion (PCT/GB2005/004009), Jan. 11, 2006.

International Search Report (CPW 21582 EP), Mar. 11, 2005.

International Search Report and Opinion (PCT/GB2004/001497), Jul. 20, 2004.

International Search Report and Opinion (PCT/GB2004/001842), Dec. 10, 2004.

International Search Report and Opinion (PCT/GB2004/002674), Dec. 16, 2004.

International Search Report And Opinion (PCT/GB2004/002968), Nov. 16, 2004.

International Search Report and Opinion (PCT/GB2004/004242), Feb. 10, 2005.

International Search Report and Opinion (PCT/GB2004/000689), Jun. 4, 2004.

International Search Report and Opinion (PCT/GB2004/002727), Mar. 11, 2005.

International Search Report and Opinion (PCT/GB2004/002747, Mar. 11, 2005.

International Search Report and Opinion (PCT/GB2005/004010), Feb. 21, 2006.

International Search Report and Opinion (PCT/GB2006/004102), Feb. 20, 2007.

International Search Report and Opinion (PCT/GB2006/004137), Jun. 5, 2008.

International Search Report and Opinion (PCT/GB2006/004852), Mar. 7, 2007.

International Search Report and Opinion (PCT/GB2006/000366), Jun. 22, 2006.

International Search Report and Opinion (PCT/GB2005/003747), Dec. 12, 2005.

International Search Report and Opinion (PCT/GB2004/002948), May 24, 2005.

International Search Report and Opinion (PCT/GB2005/000637), Jun. 2, 2005.

International Search Report and Opinion (PCT/GB2005/000634), Jun. 8, 2005.

International Preliminary Report on Patenability (PCT/GB2005/000634), Sep. 14, 2006.

Paccaloni, et al., "Key Factors for Enhanced Results of Matrix Stimulation Treatments," SPE 17154, Feb. 1998.

Paccaloni, et al., "Advances in Matrix Stimulation Technology," SPE 20623, Mar. 1993.

Nguyen, et al., Controlling Proppant Flowback in High-Temperature, High-Production Wells, SPE 82215, May 2003.

Dusterhoft, et al., "Maximizing Effective Proppant Permeability Under High-Stress, High Gas-Rate Conditions," SPE 90398, Sep. 2004.

\* cited by examiner

METHODS OF ENHANCING UNIFORM PLACEMENT OF A RESIN IN A SUBTERRANEAN FORMATION

BACKGROUND

The present invention relates to the treatment of subterranean formations. More particularly, the present invention relates to methods of enhancing uniform placement of a resin in a subterranean formation.

Hydrocarbon wells are often located in subterranean formations that contain unconsolidated particulates (e.g., sand, gravel, proppant, fines, etc.) that may migrate out of the subterranean formation with the oil, gas, water, and/or other fluids produced by the wells. The presence of such particulates in produced fluids is undesirable in that the particulates may abrade pumping and other producing equipment and/or reduce the production of desired fluids from the well. Moreover, particulates that have migrated into a well bore (e.g., inside the casing and/or perforations in a cased hole), among other things, may clog portions of the well bore, hindering the production of desired fluids from the well. The term "unconsolidated particulates," and derivatives thereof, is defined herein to include loose particulates and particulates bonded with insufficient bond strength to withstand the forces created by the production of fluids through the formation. Unconsolidated particulates may comprise, among other things, sand, gravel, fines and/or proppant particulates in the subterranean formation, for example, proppant particulates placed in the subterranean formation in the course of a fracturing or gravel-packing operation. The terms "unconsolidated subterranean formations," "unconsolidated portions of a subterranean formation," and derivatives thereof are defined herein to include any formations that contain unconsolidated particulates, as that term is defined herein. "Unconsolidated subterranean formations," and "unconsolidated portions of a subterranean formation," as those terms are used herein, include subterranean fractures wherein unconsolidated particulates reside within the open space of the fracture (e.g., forming a proppant pack within the fracture).

One method of controlling particulates in such unconsolidated formations has been to produce fluids from the formations at low flow rates, so that the near well stability of sand bridges and the like may be substantially preserved. The collapse of such sand bridges, however, may nevertheless occur, possibly due to unintentionally high production rates and/or pressure cycling as may occur from repeated shut-ins and start ups of a well. The frequency of pressure cycling is critical to the longevity of the near well formation, especially during the depletion stage of the well when the pore pressure of the formation has already been significantly reduced.

Another method of controlling particulates in unconsolidated formations involves placing a filtration bed containing gravel (e.g., a "gravel pack") near the well bore to present a physical barrier to the transport of unconsolidated formation fines with the production of desired fluids. Typically, such "gravel-packing operations" involve the pumping and placement of a quantity of certain particulates into the unconsolidated formation in an area adjacent to a well bore. One common type of gravel-packing operation involves placing a screen in the well bore and packing the surrounding annulus between the screen and the well bore with gravel of a specific size designed to prevent the passage of formation sand. The screen is generally a filter assembly used to retain the gravel placed during the gravel-pack operation. A wide range of sizes and screen configurations are available to suit the characteristics of the gravel-pack sand used. Similarly, a wide range of sizes of gravel is available to suit the characteristics of the unconsolidated particulates in the subterranean formation. To install the gravel pack, the gravel is carried to the formation in the form of a slurry by mixing the gravel with a treatment fluid, which is usually viscosified. Once the gravel is placed in the well bore, the viscosity of the treatment fluid may be reduced, and it is returned to the surface. The resulting structure presents a barrier to migrating sand from the formation while still permitting fluid flow.

However, the use of such gravel-packing methods may be problematic. For example, gravel packs may be time consuming and expensive to install. Due to the time and expense needed, it is sometimes desirable to place a screen without the gravel. Even in circumstances in which it is practical to place a screen without gravel, it is often difficult to determine an appropriate screen size to use as formation sands tend to have a wide distribution of grain sizes. When small quantities of sand are allowed to flow through a screen, formation erosion becomes a significant concern. As a result, the placement of gravel as well as the screen is often necessary to assure that the formation sands are controlled. Expandable sand screens have been developed and implemented in recent years. As part of the installation, an expandable sand screen may be expanded against the well bore, cased hole, or open hole for sand control purposes without the need for gravel packing. However, expandable screens may still exhibit such problems as screen erosion and screen plugging.

Another method used to control particulates in unconsolidated formations involves consolidating unconsolidated particulates into stable, permeable masses by applying a consolidating agent (e.g., a resin or tackifying agent) to the subterranean formation. Such resin application may be problematic when, for example, an insufficient amount of spacer fluid is used between the application of the resin and the application of the external catalyst. The resin may come into contact with the external catalyst in the well bore itself rather than in the unconsolidated subterranean producing zone. When resin is contacted with an external catalyst, an exothermic reaction occurs that may result in rapid polymerization, potentially damaging the formation by plugging pore channels, halting pumping when the well bore is plugged with solid material, or resulting in a downhole explosion as a result of the heat of polymerization. Uniform placement of curable resin into the formations having long intervals is most desirable. However, formations often comprise a wide range of permeabilities even within a single reservoir located along a well bore. As a result, using these conventional processes to treat long intervals (e.g., over about 20 feet) of unconsolidated regions has often heretofore resulted in non-uniform, limited, and/or inadequate penetration distances of consolidating agents into formations.

SUMMARY

The present invention relates to the treatment of subterranean formations. More particularly, the present invention relates to methods of enhancing uniform placement of resin in a subterranean formation.

One embodiment of the present invention is a method comprising: introducing a preflush fluid comprising an oil-soluble diverting agent into a portion of a subterranean formation; introducing a resin and an aqueous soluble diverting agent into at least a portion of the subterranean formation; allowing the oil-soluble diverting agent to at least partially dissolve; and allowing the resin to at least partially consolidate at least a portion of the subterranean formation.

Another embodiment of the present invention is a method comprising: introducing a preflush fluid comprising an oil-soluble diverting agent into a portion of a subterranean formation; introducing a resin and an aqueous soluble diverting agent into at least a portion of the subterranean formation; allowing the resin to at least partially dissolve the oil-soluble diverting agent; introducing an afterflush fluid comprising an oil soluble diverting agent into a portion of a subterranean formation; and allowing the afterflush fluid to at least partially dissolve the aqueous soluble diverting agent.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to the treatment of subterranean formations. More particularly, the present invention relates to methods of enhancing uniform placement of a resin in a subterranean formation.

I. Methods of the Present Invention

The methods of the present invention generally comprise: introducing a pre-flush fluid comprising an oil-soluble diverting agent into a portion of a subterranean formation; introducing a resin and an aqueous soluble diverting agent into at least a portion of the subterranean formation; allowing the oil soluble diverting agent to at least partially dissolve; and allowing the resin to at least partially consolidate at least a portion of the subterranean formation. The resin and aqueous soluble diverting agents may be provided and/or introduced into the subterranean formation as a component of one or more treatment fluids introduced into the subterranean formation. The term "diverting agent," is defined herein to include any substance whose presence may, at least in part, ensure substantially uniform injection of a treatment fluid over the region of the subterranean formation to be treated.

The subterranean formations treated in the methods of the present invention may be any subterranean formation wherein at least a plurality of unconsolidated particulates resides in the formation. The subterranean formation may be penetrated by a well bore through which the resin and/or other treatment fluids may be introduced. A well bore penetrating the subterranean formation being treated may contain one or more casing strings (e.g., "cased" or "partially cased"), or the well bore may be uncased. Such a well bore optionally may contain one or more screens (e.g., gravel packs) to, inter alia, provide some degree of sand control in the well.

The methods of the present invention include introducing one or more preflush fluids comprising an oil soluble diverting agent into the subterranean formation at any stage of the treatment process. The term "preflush fluid" is defined herein to include any fluid (e.g., a liquid, a gel, a gas, or combination thereof) that may be introduced into a subterranean formation prior to some other process or occurrence in the subterranean formation, and does not require any particular action by the preflush fluid. The preflush fluid may be introduced into the subterranean formation using any means suitable for introducing fluids into the subterranean formation. Typically, a preflush fluid may be introduced into the subterranean formation at any time before the resin is introduced into the subterranean formation. The preflush fluids used in the methods of the present invention further comprise an oil soluble diverting agent. The oil-soluble diverting agent may at least partially ensure substantially uniform injection of a consolidating treatment fluid over the region of the subterranean formation to be treated. In certain embodiments, a preflush fluid may be applied to the subterranean formation, among other purposes, to clean out undesirable substances (e.g., oil, residue, or debris) from the pore spaces in the matrix of the subterranean formation and/or to prepare the subterranean formation for later placement of the resin. For example, an acidic preflush fluid may be introduced into at least a portion of the subterranean formation that may, inter alia, dissolve undesirable substances in the subterranean formation. Generally, the volume of the preflush fluid introduced into the formation ranges from about 0.1 times to about 50 times the volume of the resin. Examples of preflush fluids that may be suitable for use with the present invention are described in more detail in Section II.A below.

The methods of the present invention optionally may include applying one or more afterflush fluids into the subterranean formation at any stage of the treatment process. The term "afterflush fluid" is defined herein to include any fluid (e.g., a liquid, a gel, a gas, or combination thereof) that may be introduced into a subterranean formation after some other process or occurrence in the subterranean formation, and does not require any particular action by or purpose of the afterflush fluid. Where used, the afterflush fluid may be introduced into the subterranean formation using any means suitable for introducing fluids into the subterranean formation. Typically, injection of an afterflush fluid may occur at any time after the resin is introduced into the subterranean formation. When used, the afterflush fluid is preferably placed into the subterranean formation while the resin is still in a flowing state. For example, an afterflush fluid may be placed into the formation prior to a shut-in period. Optionally, the afterflush may further comprise an oil soluble diverting agent. In certain embodiments, an afterflush fluid may be applied to the subterranean formation, among other purposes, to restore the permeability of a portion of the subterranean formation by displacing at least a portion of the resin from the pore channels therein or forcing the displaced portion of the resin further into the subterranean formation where it may have negligible impact on subsequent hydrocarbon production. Generally, the volume of afterflush fluid introduced into the subterranean formation ranges from about 0.1 times to about 50 times the volume of the resin. In some embodiments of the present invention, the volume of afterflush fluid introduced into the subterranean formation ranges from about 0.1 times to about 5 times the volume of the resin. Examples of afterflush fluids that may be suitable for use with the present invention are described in more detail in Section II.A below.

According to the methods of the present invention, after placement of the resin, the subterranean formation may be shut in for a period of time to allow the resin composition to transform a portion of the subterranean formation into a consolidated region. The shutting-in of the well bore for a period of time may, inter alia, stabilize unconsolidated portions of the subterranean formation, for example, by enhancing the curing of the resin between formation particulates. Typically, the shut-in period of the well bore occurs after placement of the resin. In embodiments using an afterflush fluid, the shut-in period preferably occurs after the use of the afterflush fluid. The optional shut-in time period is dependent, among other things, on the composition of the resin used and the temperature of the formation. Generally, the chosen period of time will be between about 0.5 hours and about 72 hours or longer. Determining the proper period of time to shut in the formation is within the ability of one skilled in the art with the benefit of this disclosure.

The methods of the present invention optionally may comprise performing one or more additional subterranean treatments for a variety of different purposes, for example, to restore the permeability of a portion of the subterranean formation that has undergone a consolidation treatment (including, but not limited to, a treatment performed according to a method of the present invention). These additional treatments may be performed prior to, during, or subsequent to performing all or some part of a method of the present invention. As used herein, the term "treatment," or "treating," refers to any subterranean operation performed in conjunction with a desired function and/or for a desired purpose. The term "treatment," or "treating," does not imply any particular action.

In certain embodiments, one or more fractures may be created or enhanced in a portion of the subterranean formation, among other purposes, to at least partially restore the permeability of the portion of the subterranean formation and reconnect the well bore with portions of the formation (e.g., the reservoir formation) outside the consolidated region. "Enhancing" one or more fractures in a subterranean formation, as that term is used herein, refers to the extension or enlargement of one or more new, natural, or previously created fractures in the subterranean formation. This fracturing may be accomplished by any means known by a person skilled in the art for creating or enhancing one or more fractures in a subterranean formation. For example, a hydraulic fracturing treatment may be used wherein a fluid (e.g., a fracturing fluid, a fluid comprising the relative permeability modifier) is introduced into the subterranean formation at a pressure sufficient to create or enhance one or more fractures in the formation. In certain embodiments, the fluid used in the hydraulic fracturing treatment may comprise a viscosified fluid (e.g., a fluid comprising a gelling agent, a crosslinked gelling agent, a surfactant, or a combination thereof). In certain embodiments, a fluid (e.g., a fracturing fluid) comprising proppant particulates may be introduced into the subterranean formation, and the proppant particulates therein may be deposited in the fracture, among other purposes, to maintain fluid conductivity of the fracture. The proppant may be coated with a curable resin or consolidating agent to form a hard, permeable solid mass in the fracture or fractures, among other things, to prevent proppant flow back during production from the well. The proppant also may be blended with fibrous particulates to form a stable network with the proppant and also partially control proppant flow back.

II. Fluids, Resins, and Diverging Agents

A. Fluids

In certain embodiments, the resin may be provided and/or introduced into the subterranean formation as a component of one or more treatment fluids introduced into the subterranean formation. These treatment fluids may include any non-aqueous based fluid that does not adversely interact with the other components used in accordance with this invention or with the subterranean formation. Non-aqueous based treatment fluids may comprise one or more organic liquids, such as hydrocarbons (e.g., kerosene, xylene, toluene, or diesel), oils (e.g., mineral oils or synthetic oils), esters, and the like.

The preflush and afterflush fluids utilized in certain embodiments of the present invention may include any aqueous based fluid that does not adversely interact with the other components used in accordance with this invention or with the subterranean formation. Aqueous base fluids may comprise fresh water, salt water, brine, or seawater, or any other aqueous fluid that does not adversely react with the other components used in accordance with this invention or with the subterranean formation. In certain embodiments, a preflush or afterflush fluid may comprise a surfactant. Any surfactant compatible with later-used treatments (e.g., a resin) may be used in the present invention, for example, to aid a resin in flowing to the contact points between adjacent particulates in the formation. Such surfactants include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773, the relevant disclosure of which is incorporated herein by reference. A $C_{12}$-$C_{22}$ alkyl phosphonate surfactant is preferred. The surfactant or surfactants used may be included in the preflush or afterflush fluid in an amount sufficient to prepare the subterranean formation to receive a consolidation treatment. In some embodiments of the present invention, the surfactant is present in the preflush or afterflush fluid in an amount in the range of from about 0.1% to about 10% by weight of the aqueous fluid.

The treatment fluids, preflush fluids, and/or afterflush fluids utilized in methods of the present invention may comprise any number of additional additives, including, but not limited to, salts, surfactants, acids, fluid loss control additives, gas, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, particulate materials (e.g., proppant particulates) and the like. In certain embodiments the treatment fluids, preflush fluids, and/or afterflush fluids may comprise an activator or catalyst which may be used, inter alia, to activate the polymerization of the resin. A person skilled in the art, with the benefit of this disclosure, will recognize the types of additives that may be included in the treatment fluids, preflush fluids, and/or afterflush fluids for a particular application.

B. Resins

Resins suitable for use in the present invention include any resin that is capable of forming a hardened, consolidated mass. The term "resin" as used herein includes any of numerous physically similar polymerized synthetics or chemically modified natural resins, including but not limited to thermoplastic materials and thermosetting materials. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (i.e., less than 250° F.) but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

Selection of a suitable resin may be affected by the temperature of the subterranean formation to which the fluid will be introduced. By way of example, for subterranean formations having a bottom hole static temperature ("BHST") ranging from about 60° F. to about 250° F., two component epoxy based resins comprising a hardenable resin component and a hardening agent component containing specific hardening agents may be preferred. For subterranean formations having a BHST ranging from about 300° F. to about 600° F., a furan based resin may be preferred. For subterranean formations having a BHST ranging from about 200° F. to about 400° F., either a phenolic based resin or a one component HT epoxy based resin may be suitable. For subterranean formations having a BHST of at least about 175° F., a phenol/phenol formaldehyde/furfuryl alcohol resin may also be suitable.

Any solvent that is compatible with the chosen resin and achieves the desired viscosity effect is suitable for use in the present invention. Some preferred solvents are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin chosen and is within the ability of one skilled in the art with the benefit of this disclosure.

C. Diverting Agents

Suitable diverting agents for use in the present invention include any substance whose presence may, at least in part, ensure substantially uniform injection of a treatment fluid over the region of the subterranean formation to be treated. As injected fluids tend to follow the path of least resistance, the least permeable areas of the subterranean formation may receive inadequate treatment. By using a diverting agent, a treatment may be focused on an area where the treatment is most desired. Additionally, the diversion effect of the diverting agent should preferably be temporary to enable productivity of the well after treatment. Examples of suitable diverting agents include aqueous soluble diverting agents and oil soluble diverting agents.

1. Aqueous Soluble Diverting Agents

Aqueous soluble diverting agents suitable for use in the methods of the present invention may comprise any aqueous soluble diverting agent capable of degrading and/or dissolving in the presence of an aqueous based fluid. In one embodiment, a resin and an aqueous soluble diverting agent may be introduced into the subterranean formation and the resin may then be diverted by the diverting agent. Examples of suitable aqueous soluble diverting agents include KCl, NaCl, NH$_4$Cl, CaCl$_2$, and rock salt.

2. Oil Soluble Diverting Agents

Oil soluble diverting agents suitable for use in the methods of the present invention may comprise any oil soluble diverting agent capable of degrading and/or dissolving in the presence of an oil based fluid. In one embodiment, a preflush fluid comprising an oil soluble diverting agent, and optionally an afterflush fluid comprising an oil soluble diverting agent, may be introduced into the subterranean formation and the preflush and/or afterflush may then be diverted by the diverting agent. Examples of suitable oil soluble diverting agents include napthalene, xylene, toluene, benzene, ethyl benzene, crude oil, mineral oil, oil-soluble resin particulates, and emulsions with an oil phase.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    introducing a preflush fluid comprising an oil-soluble diverting agent into a portion of a subterranean formation;
    introducing a resin and an aqueous soluble diverting agent into at least a portion of the subterranean formation;
    allowing the oil-soluble diverting agent to at least partially dissolve;
    introducing an afterflush fluid comprising an oil soluble diverting agent into a portion of a subterranean formation; and
    allowing the resin to at least partially consolidate at least a portion of the subterranean formation.

2. The method of claim 1 wherein the resin is selected from the group consisting of a two component epoxy based resin, novolak resin, polyepoxide resin, phenol-aldehyde resin, urea-aldehyde resin, urethane resin, phenolic resin, furan resin, furan/furfuryl alcohol resin, phenolic/latex resin, phenol formaldehyde resin, polyester resin and hybrids and copolymers thereof, polyurethane resin and hybrids and copolymers thereof, acrylate resin, and mixtures thereof.

3. The method of claim 1 wherein the oil soluble diverting agent is selected from the group consisting of napthalene, xylene, toluene, benzene, ethyl benzene, crude oil, mineral oil, emulsions with an oil phase, and combinations thereof.

4. The method of claim 1 wherein the aqueous soluble diverting agent is selected from the group consisting of KCl, NaCl, NH$_4$Cl, CaCl$_2$, rock salt and combinations thereof.

5. The method of claim 1 wherein introducing the resin into the subterranean formation occurs after introducing the preflush fluid into an unconsolidated portion of a subterranean formation.

6. The method of claim 1 wherein the preflush fluid is selected from the group consisting of fresh water, salt water, brine, and seawater.

7. The method of claim 1 wherein the afterflush fluid is selected from the group consisting of fresh water, salt water, brine, and seawater.

8. The method of claim 1 further comprising the step of allowing the afterflush fluid to at least partially dissolve the aqueous soluble diverting agent.

9. The method of claim 1 wherein the preflush fluid is introduced into the subterranean formation in an amount in the range of from about 0.1 times to about 50 times the volume of the resin.

10. A method comprising:
introducing a preflush fluid comprising an oil-soluble diverting agent into a portion of a subterranean formation;
introducing a resin and an aqueous soluble diverting agent into at least a portion of the subterranean formation;
allowing the resin to at least partially dissolve the oil-soluble diverting agent;
introducing an afterflush fluid comprising an oil soluble diverting agent into a portion of a subterranean formation; and
allowing the afterflush fluid to at least partially dissolve the aqueous soluble diverting agent.

11. The method of claim 10 wherein the resin is selected from the group consisting of a two component epoxy based resin, novolak resin, polyepoxide resin, phenol-aldehyde resin, urea-aldehyde resin, urethane resin, phenolic resin, furan resin, furan/furfuryl alcohol resin, phenolic/latex resin, phenol formaldehyde resin, polyester resin and hybrids and copolymers thereof, polyurethane resin and hybrids and copolymers thereof, acrylate resin, and mixtures thereof.

12. The method of claim 10 wherein the oil soluble diverting agent is selected from the group consisting of napthalene, xylene, toluene, benzene, ethyl benzene, crude oil, mineral oil, emulsions with an oil phase, and combinations thereof.

13. The method of claim 10 wherein the aqueous soluble diverting agent is selected from the group consisting of KCl, NaCl, $NH_4Cl$, $CaCl_2$, rock salt and combinations thereof.

14. The method of claim 10 wherein introducing the resin into the subterranean formation occurs after introducing the preflush fluid into an unconsolidated portion of a subterranean formation.

15. The method of claim 10 wherein introducing the afterflush fluid into the subterranean formation occurs after introducing the resin and the aqueous soluble diverting agent into an unconsolidated portion of a subterranean formation.

16. The method of claim 10 wherein the pre-flush fluid is selected from the group consisting of fresh water, salt water, brine, and seawater.

17. The method of claim 10 wherein the afterflush fluid is selected from the group consisting of fresh water, salt water, brine, and seawater.

18. The method of claim 10 wherein the preflush fluid is introduced into the subterranean formation in an amount in the range of from about 0.1 times to about 50 times the volume of the resin.

19. A method comprising:
introducing a preflush fluid comprising an oil-soluble diverting agent and at least one fluid selected from the group consisting of fresh water, salt water, brine, and seawater into a portion of a subterranean formation;
introducing a resin and an aqueous soluble diverting agent into at least a portion of the subterranean formation;
allowing the oil-soluble diverting agent to at least partially dissolve; and
allowing the resin to at least partially consolidate at least a portion of the subterranean formation.

* * * * *